United States Patent Office 2,938,800
Patented May 31, 1960

2,938,800

BLOOD BASE COLORING COMPOSITION

Louis Sair, Evergreen Park, Ill., assignor to The Griffith Laboratories, Inc., Chicago, Ill., a corporation of Illinois No Drawing. Filed Oct. 3, 1958, Ser. No. 765,064

8 Claims. (Cl. 99—148)

The present invention relates generally to a proteinaceous coloring composition useful in coloring and enhancing the red color of comminuted meat and fish products, and to impart red color to meatless food products, such as vegetable-base sausage and loaf; and in particular, to one having animal blood hemoglobin as its base.

Heretofore, blood has been used to give a good red color to dog foods. Blood has been added to sausage as a food ingredient. It is desirable to use blood for its color to enhance the normal color of fresh and cured meat products by increasing the content of hemoglobin from which red color is derived.

Where blood is used for this purpose, as in blood sausage, it is quickly and directly conveyed from the slaughterhouse to the meat-compounding quarters. It is highly subject to spoilage. In view of the coloring value of whole blood or red blood pigment, attempts have been made to spray-dry the blood without destroying the valuable pigment but these dried products normally go brown in color rapidly indicating an oxidation of the blood pigments.

It is the general object of the present invention to provide a blood-base red-coloring composition and in particular one which may be rendered stable against putrefaction and oxidation, which can be stored without refrigeration and which therefore, can be shipped in unrefrigerated trucks or other conveyances.

It is one object of the invention to provide the coloring composition in a paste form.

It is another object of the invention to provide the coloring composition in a liquid form.

Heretofore, there have been attempts to dry blood in various ways for use as a pigment, but such attempts have failed because the dried product has a brown color. The present invention is based upon observations of color change during the action to dry blood.

To eliminate the factor of oxidation, blood was evaporated in a vacuum at a temperature of about 105° F. It was observed that on the dome of the evaporator there were brown spots of blood while the mass of liquid was red as initially introduced. This led to the discovery that there is an intermediate state of dewatered blood beyond which the partially dewatered blood becomes brown.

Whole blood contains about 80% of water, and about 20% of solids comprising plasma solids and hemoglobin solids, the latter being the ferro-protein which forms the said red and brown colors. Blood may be centrifuged, thereby to remove liquid plasma and thus form aqueous hemoglobin solids, hereinafter referred to as "wet pigment solids," to distinguish from the analytical designation "dry pigment solids." The liquid plasma contains about 10% solids, and the "wet pigment solids" contain 34% to 38% dry pigment solids, varying largely with the centrifugal separation.

It is preferred, although not necessary, to use the wet pigment solids as the raw material for the present invention for several reasons. A higher concentration of hemoglobin is present in the raw material by loss of the water and the solids of the liquid plasma. The plasma is available for other uses not pertaining to the present invention. Thus, merely by centrifuging blood, the content of solids is raised from 20% to 34% to 38%.

The wet pigment solids are some kind of a loose combination of water and hemoglobin along with solvent water of the blood. A portion of the water is held by the hemoglobin in a bound form, while the remainder can be considered as water of solution. I have discovered that to a limited degree water may be removed from blood or from wet pigment solids as by vacuum evaporation, without changing the red color. But beyond a critical point, removal of water results in change of color from red to brown. This explains the brown spots in the dome of the evaporator, previously referred to. By spattering of the contents to the dome, and overdrying the spattered material, the color changed from red to brown. Apparently, the bound water must not be removed from the hemoglobin pigment if the original red color is to be retained. As a consequence, when blood is so evaporated for the purposes of the present invention, spattering is offset or avoided, and this may be done by constantly flushing the interior surface of the evaporator with the liquid contents thereof.

I have determined that when a resulting hemoglobin-water complex is formed by dewatering blood or wet pigment solids, and it has a water content somewhere in the vicinity of 12% to 15%, further removal of water effects a change from red to brown. This is not clear cut, due perhaps to a mixture of protein molecules, so for safety and assurance I have herein considered the red-colored hemoglobin-water complex having a content of water not less than a value in the range from 12% to 15% to be or to act like a single substance which for the purposes of the present invention I have designated as the "minimal hemoglobin hydrate" and as MHH.

The minimal hemoglobin hydrate may be prepared from fresh blood or from wet pigment solids by vacuum evaporation. It spoils and is not a commercial product unless used promptly. The moisture therein favors the growth of microorganisms or enzymatic decomposition.

By adding other solids to the minimal hemoglobin hydrate (MHH) or to a more aqueous mass containing it, a stable pigmenting paste for red color may be formed. This may be done by adding water-sharing edible material such as dextrose, sucrose, and intermediate products of hydrolyzing starch, such as dry syrup solids. Also, a small amount of preservative, such as propylene glycol, is included against bacteria and molds. Such a paste tends to become hard, and not easily handled, so it is made plastic by adding an oleaginous softening agent, such as fat or oil. This also inhibits oxidation by minimizing access of air to the hemoglobin content.

Suitable analytical paste formulas are as follows:

| | Example 1, Parts by Weight | Example 2, Parts by Weight |
|---|---|---|
| Dry blood pigment solids [1] | 20 | 20 |
| Water [1] | 20 | 20 |
| Oil or fat | 20 | 40 |
| Corn sugar | 35 | 55 |
| Propylene glycol | 5 | 5 |
| | 100 | 140 |

[1] Equivalent to
MHH—22.73 to 23.53
Water—17.27 to 16.47 } May be a single formula ingredient.

Example 1 has 20% water and Example 2 has 14.3% water, referred to hereinafter in round numbers as 14%.

The foregoing composition may be made by dewatering the higher hemoglobin hydrate of blood, or of wet pigment solids of blood, to achieve about equal parts of homoglobin and water, thus avoiding the necessity to dewater to the MHH form. It is to be understood that the blood used in the present invention as raw material is that containing anti-coagulant of which sodium citrate is a commonly used example.

Examples 1 and 2 give desirable compositions for paste formulations but can be varied considerably providing the blood pigment is not irreversibly changed, thus retaining at all times the identity of the MHH form.

Although the paste form containing the MHH may be stored at room temperature, it has some disadvantages in commercial use. It requires grease-proof containers, and it is somewhat difficult to dispense. Accordingly, there has been provided a liquid form composition containing the MHH.

The water content of whole blood or wet pigment solids can be reduced in at least two ways. The water content can be reduced by vacuum evaporation as indicated in the above described procedure for making the paste form of the MHH. As indicated for making the paste form it was found necessary to reduce the water content only about 50% of the original content and then to build up the solids of the concentrated pigment by the addition of water-sharing material to reduce the total moisture content to a point which minimized spoilage in this product, in other words, to reduce the hemoglobin's share of the water by adding solids to share in the water. In order to make a homogeneous paste containing fat, the amount of water had to be limited so that there would not be a separation of the fat from the protein solids.

It was logical to follow this same approach in making a liquid composition containing the minimal hemoglobin hydrate. However, when such a liquid composition is desired it is best to omit the addition of the fat since separation of fat will occur to give a heterogeneous product. The liquid form containing the minimal hemoglobin hydrate can be made by partially dewatering whole blood or wet pigment solids in vacuum followed by the addition of suitable additives to prevent spoilage. From a commercial standpoint, it is more practicable to eliminate the evaporation step in making a liquid composition containing the minimal hemoglobin hydrate. One procedure involves centrifugation. This mechanical procedure separates the blood pigment solids from the plasma solids and yields a blood pigment fraction with 34% to 38% dry solids. Such a wet product spoils rapidly and could not be shipped commercially in trucks. Essentially, the same effect which obtained in the paste form containing the minimal hemoglobin hydrate may be had by building up the total solids content of the aqueous blood pigment with water-sharing agents such as corn sugar, cane sugar and corn syrup solids. It has also been found desirable to add a germicide such as propylene glycol and to add a product such as sodium chloride to inhibit bacterial action. When the liquid blood pigment composition of this invention is to be consumed within a very short period of time and when the transportation to the factory is very close to the manufacturing site, it was found that the desired stability could be obtained merely by the addition of propylene glycol alone to the wet pigment solids.

In making the liquid composition containing MHH the objective is to reduce the water content by forming an altered composition containing blood or wet pigment solids to a water content by weight in the range from about 37% to about 60%, thus effecting suitable stability. This is accomplished by adding non-aqueous water-sharing content and a small quantity of a germicide to form a composition having at least 40% non-aqueous content and preferably about 63%. A suitable formulation is as follows.

| Example 3 | Parts by Weight | Non-Aqueous | Aqueous |
| --- | --- | --- | --- |
| Wet Blood Pigment Solids | 100 | 38-34 | 62-66 |
| Corn Syrup (42 Bé.) | 85 | .68 | 17 |
| Corn Sugar (hydrate) | 15 | 13.5 | 1.5 |
| Sodium Chloride | 5.5 | 5.5 | 0 |
| Propylene Glycol | 14 | 14 | 0 |
| Total | 219.5 | 139.0 to 135.0 | 80.5 to 84.5 |

In this formulation substantially all the water of the composition, except 18.5 parts out 80.5 to 84.5, is solvent water of the original blood. This particular composition has a water content in the range from 36.6 to 38.6% by weight, and a dry-pigment solids content in the range from 15.5 to 17.4%. The salt limits bacterial action. The propylene glycol prevents fermentation and mold and in its place other preservatives may be used such as sorbic acid or sodium benzoate.

A second liquid composition with a more limited use from the standpoint of stability can be made as follows:

| Example 4 | Parts by Weight |
| --- | --- |
| Wet pigment solids (38% dry solids) | 100 |
| Propylene Glycol | 3 |
| Total | 103 |

This composition has a total water content of 60%.

A liquid composition of lower content in pigment solids, and hence of lower pigmenting value is as follows:

| Example 5 | Parts by Weight |
| --- | --- |
| Whole Blood (citrated) | 100 |
| Propylene Glycol | 10 |
| Corn Sugar (anhydrous) | 23 |
| Total | 133 |

The 80% water content of the blood leads to a total water content of 60% in the completed composition.

The hemoglobin content of blood varies in the range 9.5% to 14% by weight, according to the animal, beef blood being about 10.3%. With beef blood at 9.5% hemoglobin as the content for Example 5, the composition contains 7.5% of hemoglobin calculated as dry solids. Table I gives the contents of water and of dry pigment solids in the above examples:

Table I

| Example | Percent Water | Percent By Weight of Dry Pigment Solids |
| --- | --- | --- |
| 1 | 20 | 20 |
| 2 | 14.3 | 14.3 |
| 3 | 36.7-38.5 | 15.5-17.4 |
| 4 | 60 | 36.9 |
| 5 | 60 | 7.5 |

From the foregoing it will be appreciated that the invention may be practiced in numerous ways, so long as the minimal hemoglobin hydrate of the original blood is retained.

I claim:

1. A pigmenting composition useful in coloring ground meat and fish products comprising a total water content of not over about 60% by weight, as the essential pigment the minimal hemoglobin hydrate, the latter being characterized by the red color of hemoglobin in fresh blood and by a water content in the range from 12% to 15% by weight, said latter content being included in said total water content, and edible preservative.

2. A composition according to claim 1 in which the minimal hemoglobin hydrate is provided as the centrifugal solids of blood.

3. A composition according to claim 1 in which the total water content is substantially all that water from the blood which accompanies the hemoglobin content of the composition.

4. A composition according to claim 1 in which the minimal hemoglobin hydrate is accompanied by its companion solids content in whole blood.

5. A pigmenting composition useful in coloring ground meat and fish products comprising a total water content not over about 60% by weight, as the essential pigment the minimal hemoglobin hydrate, the latter being characterized by the red color of hemoglobin in fresh blood and by a water content in the range from 12% to 15% by weight, said latter content being included in the said total water content, edible preservative, and water-sharing edible material.

6. A composition according to claim 5 in which the water-sharing edible material is dextrose.

7. A pigmenting composition useful in coloring ground meat and fish products and in the form of an aqueous liquid, comprising a total water content of not over about 60% by weight, blood solids consisting of the centrifuged solids of fresh blood and including as the essential pigment the minimal hemoglobin hydrate characterized by the red color of fresh blood and by a water content in the range of 12% to 15%, liquid corn syrup, dextrose in addition to dextrose in said syrup, and preservative comprising sodium chloride and propylene glycol.

8. A pigmenting composition useful in coloring ground meat and fish products and in the form of a paste, comprising a total water content not over about 60% by weight, as the essential pigment the minimal hemoglobin hydrate, said pigment being characterized by the red color of hemoglobin in fresh blood and by a water content in the range from 12% to 15% by weight, said water content of the pigment being included in said total water content, water-sharing edible material, oleaginous material, and an edible preservative.

References Cited in the file of this patent

UNITED STATES PATENTS

| | | |
|---|---|---|
| 1,956,784 | Allen | May 1, 1934 |
| 1,956,785 | Allen | May 1, 1934 |
| 2,021,621 | Allen | Nov. 19, 1935 |
| 2,196,238 | Werby | Apr. 9, 1940 |